June 18, 1929.  C. C. SPREEN  1,717,857
MECHANICAL REFRIGERATION
Filed Dec. 27, 1926

Charles C. Spreen
Inventor
by Smith and Freeman
Attorneys

Patented June 18, 1929.

1,717,857

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF MICHIGAN.

MECHANICAL REFRIGERATION.

Application filed December 27, 1926. Serial No. 157,212.

My invention relates to mechanical refrigeration, and particularly to means for freezing substances under the action of domestic mechanical refrigeration mechanism, and the principal object of my invention is to provide new and improved means of this type. In the drawings accompanying this specification and forming a part of this application I have shown, for purposes of illustration, one form which my invention may assume. In these drawings:

Figure 2 is a section on the line 2—2 of Figure 1, while

Figure 1:
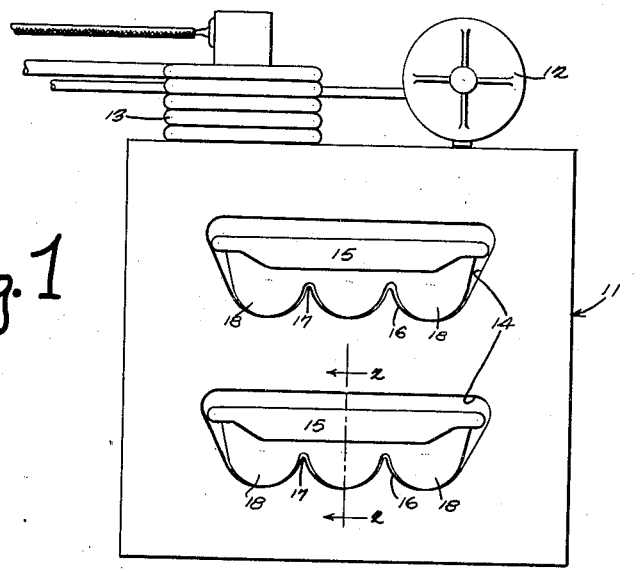
Figure 1 is a front elevation of this embodiment of my invention.
Figure 2:
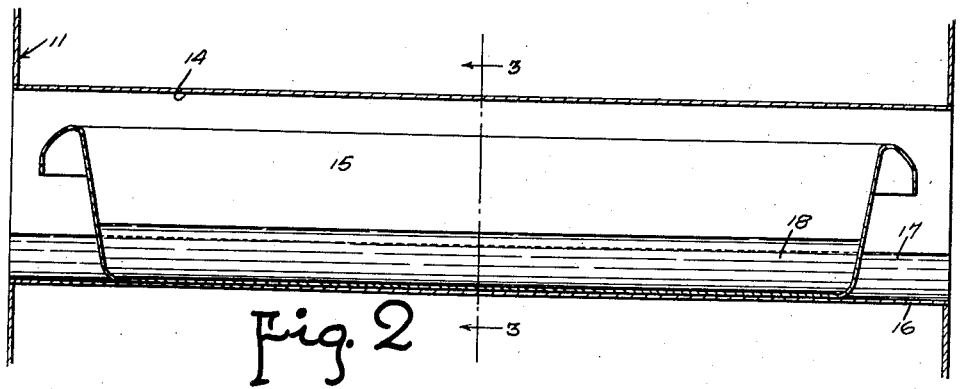
Figure 3:
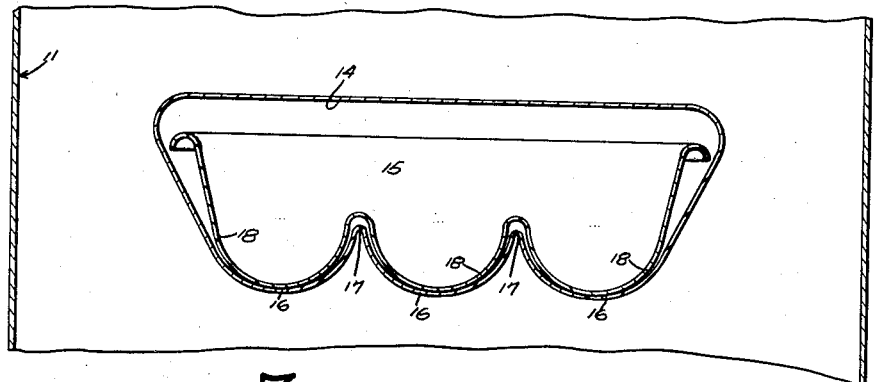
Figure 3 is a section on the line 3—3 of Figure 2.

The embodiment of my invention shown in the drawings comprises a brine tank 11 having mounted thereon an expansion valve 12 and expansion coil end turns 13 connected by an expansion coil, not shown, disposed in the brine tank 11. The tank 11 is fabricated with one or more recesses 14 extending through it from side to side and adapted to receive trays 15 which are adapted to contain the substances to be frozen, such as water, or the like.

In order to increase the area over which the refrigerant may act, the bottom wall 16 of each recess 14 is provided with a series of upwardly extending ribs or corrugations 17, while the bottom of the container 15 is provided with corresponding downwardly extending corrugations 18 which are designed to be interengaged with the corrugations in the bottom wall 16 of the recess 17 when the container 15 is disposed therein.

By this means the area of the container upon which the refrigerant acts is considerably increased, and the refrigerating action thereby accelerated.

From the above disclosure it will be obvious to those skilled in the art that I have provided improved means for freezing substances under the action of the refrigerating apparatus of mechanical refrigeration mechanism.

At the same time it will be obvious to those skilled in the art that the embodiment of my invention herein shown and described may be variously changed and modified without departing from the spirit of my invention or sacrificing the advantages thereof, and it therefore will be understood that the disclosure herein is illustrative only, and that my invention is not limited thereto.

I claim:

1. In a mechanical refrigerator system having a source of compressed refrigerant, a refrigerant-expansion refrigerating tank, and a container adapted to receive substances to be frozen; said tank having a recess extending thereinto from one lateral wall thereof and having in its bottom wall a series of corrugations extending throughout its length; and said container having corrugations extending the full length of its bottom wall corresponding to the corrugations in said bottom of said recess whereby when the container is disposed in the recess its corrugations inter-engage thermally with the corrugations of the recess to increase the effective cooling area.

2. In a mechanical refrigerator system, a tank containing a refrigerated heat transfer medium, said tank being formed with walls providing a recess extending therein, the entire surface of at least one of the walls of the recess being corrugated, and a container for receiving substances to be refrigerated adapted to be disposed within the recess in said tank, said container having a corrugated wall adapted to interfit and thermally engage substantially the entire corrugated wall surface of the recess in said tank.

In testimony whereof I hereunto affix my signature.

CHARLES C. SPREEN.